March 16, 1948. H. RINIA 2,437,860
METHOD OF MANUFACTURING AN OPTICAL ELEMENT
Filed Jan. 15, 1941
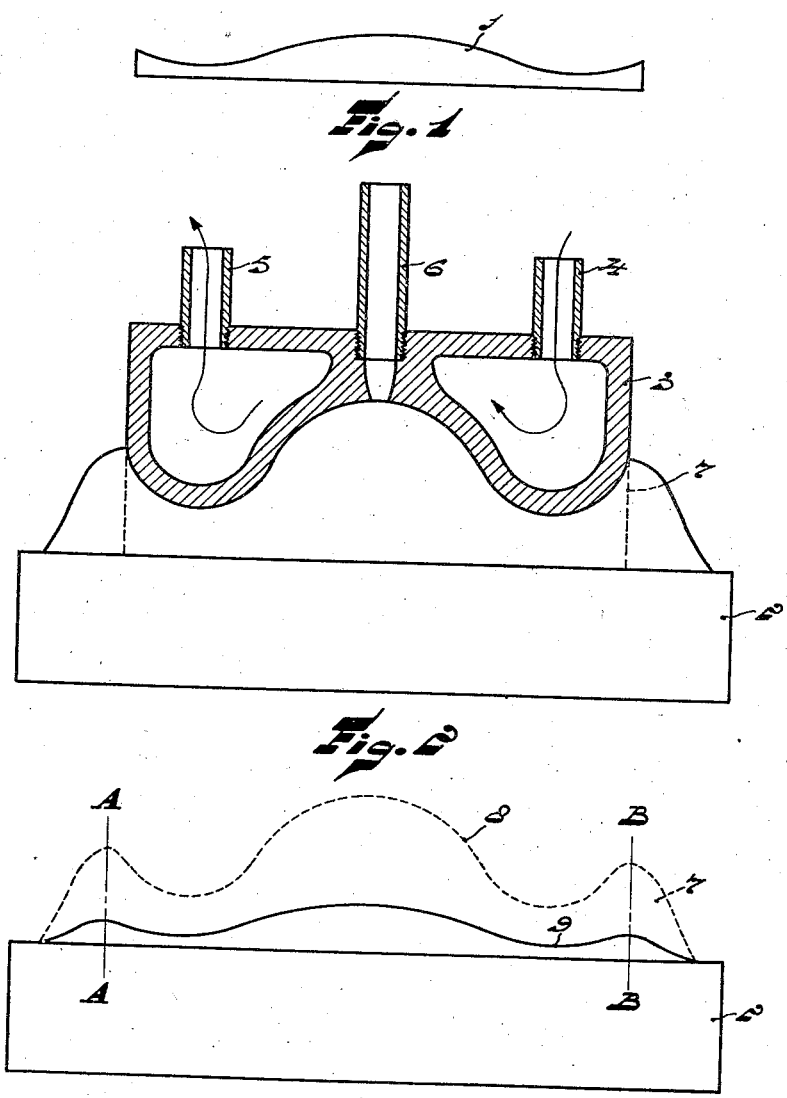
INVENTOR
H. Rinia
BY C. F. Wenderoth
ATTORNEY Patented Mar. 16, 1948

2,437,860

UNITED STATES PATENT OFFICE 2,437,860

METHOD OF MANUFACTURING OPTICAL ELEMENTS

Herre Rinia, Eindhoven, Netherlands; vested in the Attorney General of the United States Application January 15, 1941, Serial No. 374,597
In the Netherlands October 10, 1939

4 Claims. (Cl. 18—58)

Optical elements, such as lenses, have practically always been manufactured hitherto from glass or from quartz. For this purpose a plate must be ground to the desired shape, which is very expensive, particularly with surfaces which are not plane or spherical. It has also been suggested heretofore to manufacture such elements from moulding materials, for which purpose, however, a very accurately finished matrix must be at one's disposal in which all the changes of profile existing on the surface of the lens to be manufactured must be present with perfect accuracy and with exactly the dimensions prescribed. These moulded lenses have not been in general use, at least not on a large scale.

The present patent application relates to the manufacture of an optical element such as a lens, from a material which is gelatinizable in solution.

The term "gelatinizable materials" has to be understood in this connection to mean those materials which can be colloidally distributed in solution and can be separated from this colloidal solution to form a gel. Subsequently this gel can desiccate, if desired. The term "gel" means a solid material exhibiting rigidity combined with elasticity.

Materials suitable for this purpose and gelatinizable in solution may contain organic components, such as gelatine, agar-agar and pectin. It is also possible that these materials contain inorganic components, such as silicates or aluminium oxide, whether or not together with glycerine, to contribute to the optical homogeneity of the optical element concerned. The solvent serving to obtain a solution which is gelatinizable is chosen independently of the material. For gelatine, for example, water may be chosen as a solvent.

It has been mentioned before that the gel formed from the solution can desiccate. During this desiccation contraction of the material occurs. Use is made of the latter phenomenon in making the optical element according to the invention. In fact, it has been found by applicant that, independently of the concentration of the gelatinizable material in the solvent, the extent of the contraction in a definite case can be accurately determined beforehand. This contraction may be located between factors of the order of magnitude 3 and of the order of magnitude 50. It has been found by applicant that the contraction factor may be successfully chosen of the order of magnitude of 8. Due to this contraction, the matrix used for the manufacture of the optical element in question can exhibit dimensions which are far larger than the dimensions of the element to be ultimately manufactured. It is evident that this means a great advantage. If, for example, differences of thickness of, say, 0.3 mm. occur in a definite element, the matrix or mould wherein the element is to be manufactured, when assuming an 8-fold contraction, exhibits a difference of level of 2.4 mm. in the points where these differences of thickness are produced in the optical element. The matrix which consequently exhibits the profile to be manufactured on a greatly enlarged scale, may be manufactured mechanically with very great accuracy and may serve for the manufacture of a theoretically unlimited number of optical elements according to the invention. If for some reason it is undesirable that contraction occurs in a definite direction, for example, in the direction normal to the optical axis, the mould may be made to co-operate, for example, with a metal plate as a substratum, to which the gelatinizable material slightly adheres. After drying-up, in the direction in which the occurrence of contraction is thus prevented, the gelatinated material exhibits the dimensions which the material has in this direction prior to gelatinizing and drying-up.

The element obtained from the mould is preferably hardened during or after desiccation, which results in the element concerned no longer being soluble in a solvent.

One advantageous practical example of the element produced according to the invention is an element wherein one or two refracting surfaces have an aspherical or, if desired, a rotation-symmetric shape. It is difficult to make such surfaces of glass on the machine so that the manufacture of glass lenses shaped in this manner is extraordinarily expensive. Another practical example of an element produced according to the invention wherein the occurring differences of thickness in the element are of the order of magnitude of 2 mms. at most, has the additional advantage that the material is very homogeneous due to the small differences of thickness.

It has been found by applicant that the optical element according to the invention is very satisfactory as a correcting element for the occurring spherical aberration in an optical system, more particularly in the optical system of Schmidt, as described in the "Zentralzeitung für Mechanik und Optik," volume 52, 1932, number 2, in which design the element according to the invention exhibits an aspherically refracting surface.

As has already been mentioned briefly the optical element produced according to the invention may be manufactured by bringing a solution of a material which is gelatinizable in solution into a mould of such shape that the material exhibits the desired shape after being gelatinated from this solution and desiccated. In this case it is advantageous to remove the mould after the material is gelatinated from the solution.

In order that the invention may be more clearly understood and readily carried into effect, it will be explained more fully by reference to the accompanying drawing.

Fig. 1 illustrates a cross-section across the optical axis of one practical example of the optical element produced according to the invention in the form of a lens. From the figure it is obvious that the profile of the lens differs from the spherical shape; a ring-shaped embedded region is located between the elevated central portion and the elevated edge. The element shown is destined to be used in an optical system to correct therein the spherical aberration.

Fig. 2 shows the device in which the element of Fig. 1 can be made. 2 designates a plane metal plate whose top surface is placed exactly horizontally. This plate prevents contraction of the element during desiccation in the direction normal to the optical axis. A metal mould 3 which is made hollow is located above this plate at the correct distance. The interior of the mould is provided with two conductors 4 and 5 which serve for the supply and discharge of water with which the mould can be maintained at a definite temperature. The center of the mould 3 has fixed in it a tube 6 which constitutes part of a channel traversing the mould from its top side to its bottom side. This enables the mould to be supplied with the material from which the optical element is manufactured. This is, for example, hot water in which gelatine is dissolved in a definite concentration. The mould 3 and the metal plate 2 are now maintained at such temperature that the gelatine just remains in solution. Due to this, a mass 7 of dissolved gelatine is formed between the mould 3 and the metal plate 2. By gradually reducing the temperature of the mould and of the metal plate the solution 7 is gelatinated and a gel is formed which exhibits rigidity combined with a certain elasticity. The mould 3 can now be removed and on the metal plate 2 remains the gelatinated mass 7 whose top surface 8 is indicated in Fig. 3 in dotted line. If now this mass is dried the gelatinated mass 7 contracts to form pure gelatine 9, the latter surface having the desired shape. This gelatine layer may then be removed from the metal plate and is ready for use after the extreme edge located outside the lines A—A and B—B has been removed. If desired, the element may still be hardened by treating it, for example, with formaline.

Particularly in view of contraction tensions it is desirable that the element should be made as thin as possible and with as uniform a thickness as possible.

For obtaining a more uniform thickness it is also possible to give the refracting surface of the element such a shape that, in addition to containing the fourth-power, sixth-power and eighth-power parabolas which serve for correction, it contains a second-power parabola. This results in the focal distance of the optical system using the element being slightly changed. At the same time, however, the result is obtained that the thickness of the element is more uniform while in some cases the aberrations which still result outside the axis are reduced.

In the description of the drawing we have described an example of an optical element which must serve as a correcting element; it is evident, however, that any desired lens profile, for example, the spherical profile, may be obtained in the same manner.

What I claim is:

1. A method of manufacturing an optical element of a material which may gel in solution, comprising the steps of placing a quantity of the material in solution upon the surface of a support to which the gelled material adheres, forming the said material in solution into a gelled mass having thicknesses and thickness variations substantially proportional to and greater than those of the element to be formed and length dimensions substantially the same as those of the element to be formed, and desiccating said mass while on the support whereby the thicknesses and thickness variations of said mass are reduced to those of the element to be formed and the said length dimensions are maintained substantially constant.

2. A method of manufacturing an optical element of a material which may gel in solution, comprising the steps of placing a quantity of the material in solution upon the surface of a support to which the gelled material adheres, forming the said material in solution into a gelled mass having thicknesses and thickness variations substantially proportional to and of the order of 3 to 50 times as large as those of the element to be formed and length dimensions substantially the same as those of the element to be formed, and desiccating said mass while on the support whereby the thicknesses and thickness variations of said mass are reduced to those of the element to be formed and the said length dimensions are maintained substantially constant.

3. A method of manufacturing an optical element of a material which may gel in solution, comprising the steps of placing a quantity of the material in solution upon the surface of a support to which the gelled material adheres, forming the said material in solution into a gelled mass having thicknesses and thickness variations substantially proportional to and of the order of 3 to 50 times as large as those of the element to be formed and length dimensions substantially the same as those of the element to be formed, desiccating said mass while on the support whereby the thicknesses and thickness variations of said mass are reduced to those of the element to be formed and the said length dimensions are maintained substantially constant, and hardening the so desiccated mass.

4. A method of manufacturing an optical element having an aspherical surface of a material which may gel in solution, comprising the steps of placing a quantity of the material in solution upon the surface of a support to which the gelled material adheres, forming the said material in solution into a gelled mass having an aspherical surface and thickness variations substantially proportional to and of the order of 3 to 50 times as large as those of the element to be formed and length dimensions substantially the same as those of the element to be formed, and desiccating said mass while on the support whereby the thickness variations of said mass are reduced to those of the element to be formed and the said length dimensions are maintained substantially constant.

HERRE RINIA.

REFERENCES CITED

The following references are of record in the file of this patent:

UNITED STATES PATENTS

| Number | Name | Date |
|---|---|---|
| 697,959 | Abbe | Apr. 22, 1902 |
| 869,311 | Leuchter | Oct. 29, 1907 |
| 934,579 | Straubel et al. | Sept. 21, 1909 |
| 1,629,924 | McGavack | May 24, 1927 |
| 1,998,896 | Kay | Apr. 23, 1935 |
| 2,026,176 | Jaeckel | Dec. 31, 1935 |
| 2,086,286 | Stanley | July 6, 1937 |
| 2,092,789 | Tillyer | Sept. 14, 1937 |
| 2,170,979 | Straubel | Aug. 29, 1939 |
| 2,271,454 | Erdle et al. | Jan. 27, 1942 |

FOREIGN PATENTS

| Number | Country | Date |
|---|---|---|
| 101,260 | Great Britain | Aug. 31, 1916 |
| 264,466 | Great Britain | May 10, 1928 |